Dec. 8, 1942.   D. E. CHAMBERS   2,304,542
CONTROL SYSTEM
Filed Aug. 17, 1939

Inventor:
Dudley E. Chambers,
by Harry E. Dunham
His Attorney.

Patented Dec. 8, 1942

2,304,542

UNITED STATES PATENT OFFICE 2,304,542

CONTROL SYSTEM

Dudley E. Chambers, Scotia, N. Y., assignor to General Electric Company, a corporation of New York Application August 17, 1939, Serial No. 290,623

14 Claims. (Cl. 172—289)

My invention relates to control systems and particularly to a system for controlling an alternating current machine so as to prevent it from becoming overheated due to prolonged subsynchronous operation thereof, and one object of my invention is to provide an improved arrangement of apparatus for controlling an alternating current machine so as to accomplish this result.

My invention is particularly adapted for use in connection with synchronous motors which are provided with squirrel-cage windings for starting the motors as induction machines. Such starting windings are usually so constructed that they may become overheated if the accelerating period during the starting operation is unduly prolonged, and one object of my invention is to prevent such overheating of the squirrel-cage winding.

In accordance with my invention, I provide an arrangement for causing, during each slip cycle of the machine, a predetermined number of impulses of current, each being of a predetermined substantially constant quantity, to flow in a local circuit containing a heating coil of a thermal relay which in turn controls the connections of the machine in any suitable manner so as to prevent the machine from becoming overheated.

Figure 1:
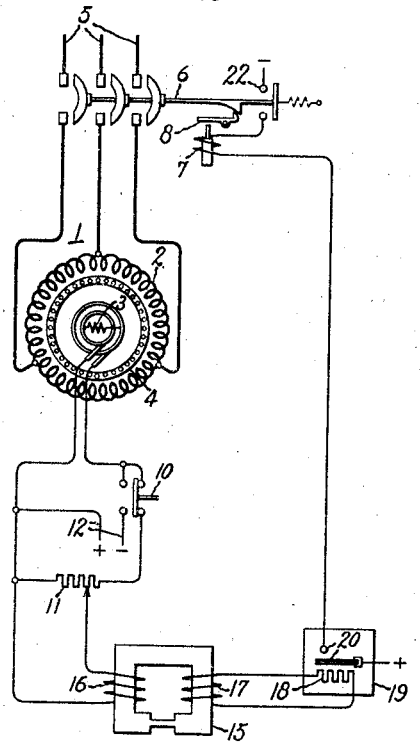
Figure 2:
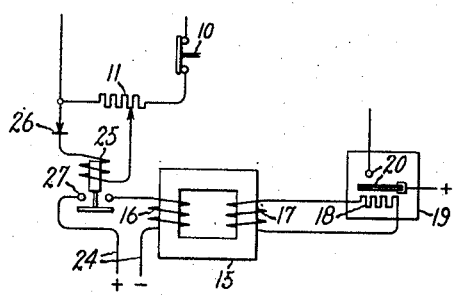

My invention will be better understood from the following description when taken in connection with the accompanying drawing, Fig. 1 of which diagrammatically illustrates a synchronous motor control system embodying my invention and Fig. 2 of which diagrammatically illustrates a modification of a portion of the synchronous motor control system shown in Fig. 1, and the scope of my invention will be pointed out in the appended claims.

Referring to Fig. 1 of the drawing, I represents a synchronous motor having a polyphase armature winding 2, a field winding 3 and a squirrel-cage winding 4. The armature winding 2 is arranged to be connected to a polyphase supply circuit 5 by means of suitable switching means 6 shown as a latched closed circuit breaker having a trip coil 7 which, when energized, releases a latch 8 to allow the circuit breaker 6 to open. The circuit of the field winding 3 is controlled by a two-position field switch 10 which in one of its positions connects a discharge resistor 11 across the terminals of the field winding 3 and which in its other position connects a suitable source of excitation 12 across the terminals of the field winding 3. In order to simplify the disclosure, I have shown the circuit breaker 6 and the field switch 10 as manually controlled devices, but it will be apparent to those skilled in the art that these devices may be automatically controlled in any well known manner.

In order to protect the squirrel-cage winding 4 of the motor 1 from becoming overheated due to prolonged subsynchronous operation of the motor, I provide in the embodiment of my invention shown in Fig. 1 a saturating or peaking transformer 15 having a primary winding 16 connected across a portion of the discharge resistor 11 and a secondary winding 17 which is connected to the heating coil 18 of a thermal relay 19, the normally open contacts 20 of which are connected in an energizing circuit for the trip coil 7 of the circuit breaker 6. The thermal relay 19 may be of any suitable construction examples of which are well known in the art which will effect the closing of its contacts after a predetermined amount of energy has been consumed by its heating coil within a predetermined time interval.

The operation of the embodiment shown in Fig. 1 is as follows: When it is desired to start the motor 1, the circuit breaker 6 is closed so that the armature winding 2 of the motor 1 is connected to the supply circuit 5. The motor 1 then starts and accelerates as an induction motor. While the motor is accelerating as an induction motor, voltages of slip frequency are induced in the field winding 3 and the squirrel-cage winding 4 so that currents of slip frequency flow through the squirrel-cage winding and through the field winding 3 if it is connected in a closed circuit. Since the field switch 10 is in the position shown during the starting operation of the motor 1, currents of slip frequency flow through the field winding 3 and the discharge resistor 11 so that a portion of the slip frequency current through the field winding 3 flows through the primary winding 16 of the saturating transformer 15. Preferably the saturating transformer 15 is designed to saturate early in its primary voltage cycle so that the quantity of energy induced in the secondary winding 17 of the transformer 15 and consumed in the heating coil 18 of the thermal relay 19 is substantially independent of the frequency and magnitude of the voltage applied across the primary winding 16. Therefore, the energy consumed in the heating coil 18 of the thermal relay 19 is in the nature of successive impulses of energy, each of approximately constant quantity and occurring once each half cycle of the slip frequency voltage applied to the primary winding 16. Furthermore, the total energy per unit of time consumed in the heating coil 18 is approximately proportional to the slip frequency so that the heating of the thermal relay 19 is also approximately proportional to the heating of the synchronous motor 1 during the starting period. Therefore, the operating time of the thermal relay 19 varies inversely with the frequency of the impulses of substantially constant energy which flow through the heating coil 18.

Normally, the motor 1 will accelerate to a desired synchronizing speed so that the field switch 10 will be operated to its running position before the thermal relay 19 can close its contacts 20. Since, in the running position of the field switch 10, the primary winding 16 of the transformer 15 is disconnected from the field winding 3, the heating coil 18 of the thermal relay 19 is ordinarily deenergized before the relay 19 can operate. However, if for some reason the starting operation of the motor is prolonged so that the amount of energy consumed by the heating coil 18 of the relay 19 is sufficient to cause the contacts 20 to close, an energizing circuit is completed for the trip coil 7 through contacts 22 of the circuit breaker 6 so that the circuit breaker 6 is opened to disconnect the armature winding 2 of the motor from the supply circuit 5 in order to shut down the motor and thereby prevent overheating thereof.

In the modification of my invention shown in Fig. 2 the transformer 15 is an ordinary transformer, the primary winding 16 of which is arranged to be connected across a source of direct current 24 by means of a quick-acting relay 25 the operating winding of which is connected in series with a half wave rectifier 26 across a portion of the discharge resistor 11. With this arrangement the relay 25 operates once during each slip cycle of the motor 1 to close and open its contacts 27 so that a current impulse of substantially the same quantity of electric energy is induced in the secondary winding 17 of the transformer 15 and flows through the heating coil 18 of the thermal relay 19 each time the relay contacts 25 are closed or opened. Thus the energy consumed in the thermal relay is approximately proportional to the slip of the motor and the temperature condition of the thermal relay is approximately proportional to the temperature of the synchronous motor during the starting operation.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination a subsynchronously operating alternating current machine, a circuit, means for causing a predetermined number of current impulses of substantially the same quantity of electric energy to flow through said circuit for each slip cycle of said machine, and a thermal relay having a heating coil connected in said circuit.

2. Means for protecting a synchronous machine against overheating due to prolonged subsynchronous operation thereof comprising a circuit, means for causing a predetermined number of current impulses of substantially the same quantity of electric energy to flow through said circuit for each slip cycle of said machine, a thermal relay having a heating coil connected in said circuit, and protective means for said machine controlled by said relay.

3. In combination a subsynchronously operating alternating current machine, a saturating transformer having a primary winding and a secondary winding, means for applying to said primary winding a voltage having a frequency proportional to the slip of said machine and a thermal device having a heating coil connected to said secondary winding.

4. In combination a subsynchronously operating synchronous machine, a saturating transformer having a primary winding connected to the field winding of said machine, a secondary winding on said transformer, and a thermal device having a heating coil connected to said secondary winding.

5. A control arrangement for a subsynchronously operating synchronous machine comprising a saturating transformer having a primary winding connected to the field winding of said machine, a secondary winding on said transformer, a thermal relay having a heating coil connected to said secondary winding, and protective means for said machine controlled by said relay.

6. In combination, an alternating current supply circuit, a synchronous motor having an armature winding and a field winding, means connecting said armature winding to said supply circuit, a saturating transformer having a primary winding connected to said field winding, a secondary winding on said transformer, a thermal relay having a heating coil connected to said secondary winding, and means controlled by said relay for disconnecting said armature winding from said supply circuit.

7. In combination a subsynchronously operating alternating current machine, a transformer having a primary and a secondary winding, a source of direct current, means for establishing and for interrupting a connection between said source and said primary winding a predetermined number of times during each slip cycle of said machine, and a thermal device having a heating coil connected to said secondary winding.

8. In combination a subsynchronously operating alternating current machine, a transformer having a primary and a secondary winding, a source of direct current, means responsive to the slip frequency of said machine for controlling a connection between said source and said primary winding, and a thermal device having a heating coil connected to said secondary winding.

9. A control arrangement for a subsynchronously operating alternating current machine comprising a transformer having a primary and a secondary winding, a source of direct current, means responsive to the slip frequency of said machine for controlling a connection between said source and said primary winding, a thermal relay having a heating coil connected to said secondary winding, and protective means for said machine controlled by said relay.

10. In combination, an alternating current supply circuit, a synchronous motor connected to said supply circuit, a transformer having a primary and a secondary winding, a source of direct current, means responsive to the slip frequency of said motor for controlling a connection between said source and said primary winding and a thermal device having a heating coil connected to said secondary winding.

11. In combination, an alternating current supply circuit, a synchronous motor connected to said supply circuit and having a field winding, a transformer having a primary and a secondary winding, a source of direct current, means responsive to the slip frequency current induced in said field winding when said motor is operating subsynchronously for controlling a connection between said source and said primary winding and a thermal device having a heating coil connected to said secondary winding.

12. In combination, an alternating current supply circuits, a synchronous motor connected to said supply circuit and having a field winding, a transformer having a primary and a secondary winding, a source of direct current, a relay connected to said field winding, a half wave rectifier connected in series with said device and said field winding, contacts controlled by said relay for connecting said source to said primary winding, and a thermal relay having a heating coil connected to said secondary winding.

13. In combination a subsynchronously operating alternating current machine, a circuit, means for causing a predetermined number of current impulses of substantially the same quantity of electric energy to flow through said circuit for each slip cycle of said machine, and means responsive to said current impulses in said circuit.

14. Means for protecting a synchronous machine against overheating due to prolonged subsynchronous operation thereof comprising a circuit, means for causing a predetermined number of current impulses of substantially the same quantity of electric energy to flow through said circuit for each slip cycle of said machine, means responsive to said current impulses in said circuit and having an operating time inversely proportional to the frequency of said impulses, and protective means for said machine controlled by said current impulse responsive means.

DUDLEY E. CHAMBERS.